(12) United States Patent
Kiss

(10) Patent No.: US 8,760,107 B2
(45) Date of Patent: Jun. 24, 2014

(54) ANCHOR CHARGER

(76) Inventor: Alexander Stephan Kiss, Lake Arrowhead, CA (US)

( * ) Notice: Subject to any disclaimer, the term of this patent is extended or adjusted under 35 U.S.C. 154(b) by 335 days.

(21) Appl. No.: 12/946,642

(22) Filed: Nov. 15, 2010

(65) Prior Publication Data

US 2011/0163711 A1 Jul. 7, 2011

Related U.S. Application Data

(60) Provisional application No. 61/335,215, filed on Jan. 4, 2010.

(51) Int. Cl.
*H02J 7/00* (2006.01)
*H02J 7/02* (2006.01)

(52) U.S. Cl.
USPC .......................... 320/101; 320/120; 114/343

(58) Field of Classification Search
USPC ................... 320/101, 118, 120, 124; 362/477; 114/343
See application file for complete search history.

(56) References Cited

U.S. PATENT DOCUMENTS

| | | | |
|---|---|---|---|
| 4,009,051 A | 2/1977 | Kazis et al. | |
| 4,209,346 A | 6/1980 | King | |
| 4,311,953 A | 1/1982 | Fukuda et al. | |
| 4,539,516 A | 9/1985 | Thompson | |
| 4,786,851 A | 11/1988 | Fuji et al. | |
| 4,808,904 A | 2/1989 | Ricaud et al. | |
| 4,871,959 A | 10/1989 | Gali | |
| 5,084,664 A | 1/1992 | Gali | |
| 5,491,399 A | 2/1996 | Gregory et al. | |
| 5,522,943 A | 6/1996 | Spencer et al. | |
| 5,701,067 A | 12/1997 | Kajai et al. | |
| 5,704,704 A | 1/1998 | Reichard et al. | |
| D400,163 S | 10/1998 | Lam | |
| 5,855,692 A | 1/1999 | Kajai et al. | |
| 5,952,815 A * | 9/1999 | Rouillard et al. | 320/116 |
| 6,086,220 A * | 7/2000 | Lash et al. | 362/244 |
| 6,155,195 A | 12/2000 | Nirenberg | |
| 6,164,803 A | 12/2000 | Reniger | |
| 6,650,085 B2 | 11/2003 | Lau et al. | |
| 6,848,815 B1 * | 2/2005 | Born | 362/477 |
| 7,207,701 B2 * | 4/2007 | Kennedy et al. | 362/477 |
| 7,508,163 B2 * | 3/2009 | Batts-Gowins | 320/105 |
| 7,679,312 B2 | 3/2010 | Toya et al. | |
| 2002/0190688 A1 | 12/2002 | Alsina | |
| 2003/0201750 A1 * | 10/2003 | Kirkpatrick | 320/101 |
| 2007/0075676 A1 | 4/2007 | Novak | |
| 2009/0001151 A1 | 1/2009 | Wagner | |
| 2009/0039705 A1 * | 2/2009 | Lyman et al. | 307/64 |

* cited by examiner

*Primary Examiner* — Yalkew Fantu
(74) *Attorney, Agent, or Firm* — Kirk A. Buhler; Buhler & Associates

(57) ABSTRACT

Improvements in a trickle charging system for a boat are presented. The anchor charger is a solar panel that harnesses sunlight to trickle charging a boat through the anchor light connection of a boat. The anchor charger helps to ensure that the battery is fully charged prior to boating & also provide some charging action while out on the water. This helps to ensure that proper battery maintenance is provided on a consistent basis. The anchor charger connect to a standard 2 pin female anchor light connection which is installed on primarily all recreational boats that normally powers an anchor light that is required on small vessels while they are at anchor. The solar collector is mounted on a pole having an adjustable swivel mount to allow the boater to position the solar collector to be adjusted for angle and spin to collect optimal sun exposure.

13 Claims, 4 Drawing Sheets

ANCHOR CHARGER

CROSS REFERENCE TO RELATED APPLICATION

This application claims the benefit of Provisional 61/335,215 filed Jan. 4, 2010 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in charging a boat battery. More particularly, the present anchor charger is a solar collector on a pivoting and rotatable extension that is adjustable to absorb optimal sun exposure. The extension plugs into the anchor light connection on a boat.

2. Description of Related Art Including Information Disclosed Under 37 CFR 1.97 and 1.98

Solar charging devices have been available for charging a number of different products such as rechargeable batteries. Boats create a unique problem whereby people often will use accessory components while the engine of the boat is off. There are a number of solar trickle charging devices that connect into the electrical system of a vehicle using the cigarette lighter. Several products and patents have been issued and or pending that show examples of these solar charging devices. Exemplary examples of patents or patent publications covering these products are disclosed herein.

U.S. Pat. No. 7,679,312 issued Mar. 16, 2010 to Shoichi Toya discloses a solar charger for rechargeable batteries where the base housing of the device is configured with different bottom angles to provide optimal charging from the sun depending upon the side the bottom of the housing is placed upon. While this patent provides charging to batteries it does not have connection to charge external batteries.

U.S. Pat. Nos. 5,701,067, 5,855,695, 6,650,085 and published application 2007/0075676 each disclose modular solar charging cell arrays that can be expanded to a larger array for charging rechargeable batteries. While these solar charging modules charge batteries, there is not a connection to provide power into the electrical system of a boat.

U.S. Pat. No. 4,786,851, 4,871,959, 5,084,664 and 7,508,163 disclose battery charging devices or trickle chargers with a wiring harness and a connector that is plugged into the cigarette lighter of an automobile. These devices provide charging of a vehicle while the vehicle is in storage and is not being used. While these devices provide charging while the vehicle is in storage they do not provide charging while a car is being driven because the alternator provides electricity that is greater than the voltage being supplied by the solar charger.

What is needed is a solar powered device that connects into the boat anchor light receptacle where the charger can be switched on to maintain a charge on the electrical system of a boat and can also provide power to a radio, bilge pump and other electrical devices that may be operated while the engine of a boat is turned off.

BRIEF SUMMARY OF THE INVENTION

It is an object of the anchor charger for the solar panel system to harness sunlight & convert it to electrical power for trickle charging. The anchor charger helps to ensure that the battery is fully charged prior to boating & also provide some charging action while out on the water. This helps to ensure that proper battery maintenance is provided on a consistent basis for the boat owner. A dead boat battery pose as a serious safety hazard, as well as interrupting boating time on the water and potentially stranding a boater from any services that provide assistance.

It is an object of the anchor charger to connect to a standard 2 pin female anchor light connection which is installed on primarily all recreational boats. This has a positive and negative connection already pre-wired by the manufacturer of the boat. The connection normally powers an anchor light that is required on small vessels while they are at anchor.

It is an object of the anchor charger to include a male connector that is secured into the female anchor light connection as any standard anchor light would be secured. This securing mechanism produces a charge to the battery by switching the anchor light switch to the ON position while a boater is mooring, beached, or at a docked status.

It is another object of the anchor charger for the solar collector to be mounted on a pole having an adjustable swivel mount to allow the boater to position the solar collector to be adjusted for angle and spin to collect optimal sun exposure.

It is still another object of the anchor charger to have pole storage clips to be mounted by the boater in a storage locker. The anchor charger provides a strong & reliable electrical supply to the battery, to avoid emergency vessel assists and charges for jump starts or complete battery replacement.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Inland water rules specify that any vessel under 50 meters (164.1') at anchor must exhibit a white 360-degree light where it can be seen and have a two-mile visibility in most situations. Vessels less than 7 meters (23.9') must display anchor lights when anchored in or near a narrow channel, fairway, or anchorage, or where other vessels normally navigate. When a boat is not anchored the anchor light is removed and the electrical connection is not used. When a boater is docked in a canyon or near rocks to enjoy the water, the boater often operates the battery to run the bilge pump. Both of these devices draw a small amount of power from the batteries of the boat. While the power used may be small, when the small power drain continues for hours the accumulated drain on the battery can be significant and may be so significant that the boater may not be able to start the engine.

Figure 1:
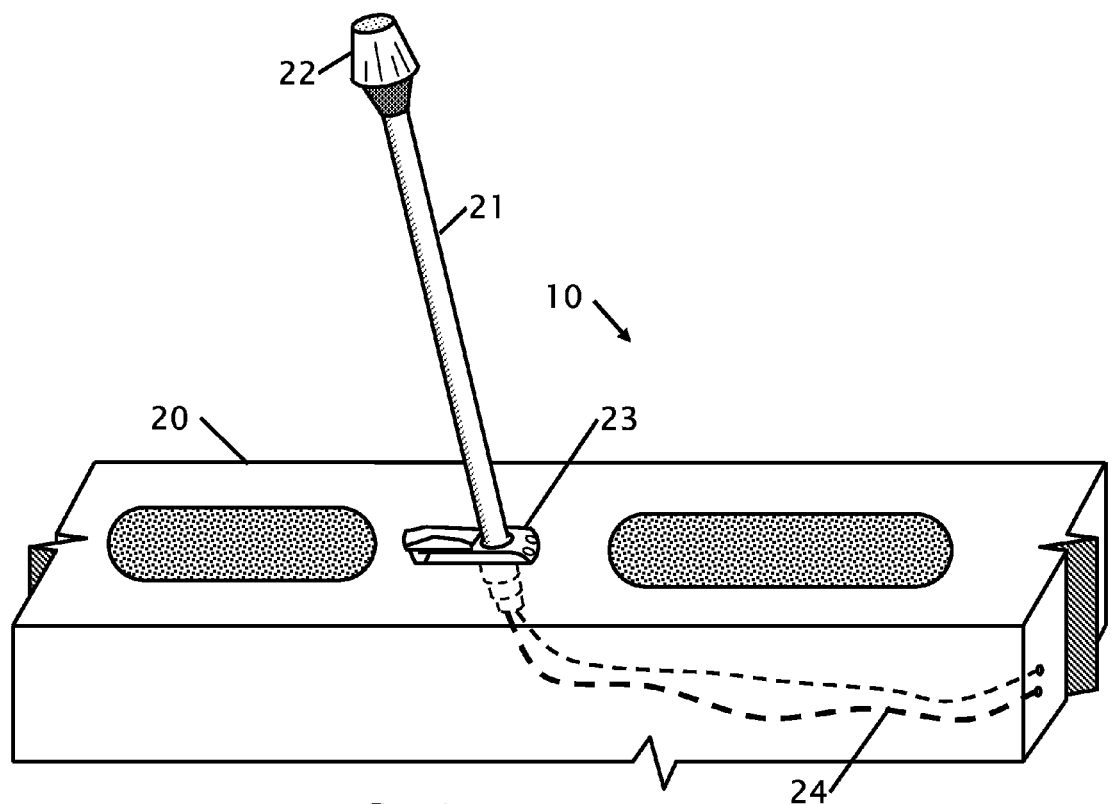
FIG. 1 shows an anchor light installed on a vessel.

FIG. 1 shows an anchor light installed on a vessel. The anchor light is essentially a light 22 on a pole 21 that is inserted into a light base assembly 23. The light base assembly 23 is often secured into the hull 20 of the sidewall of a boat where it provides structural support to the pole 21 and the light 22. The light 22 is powered by the electrical system or battery of the boat where it is wired 24 and is controlled by a switch that turns the light on and off. The power to the anchor light is usually wired separate from the accessory(ies) ignition system to allow the anchor light to be illuminated without a key in the ignition of the boat. The inside of the anchor light base is shown and described in more detail with FIG. 2.

Figure 2:
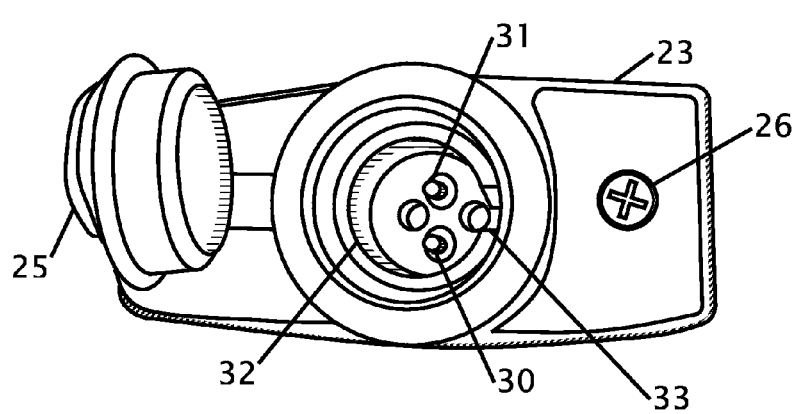
FIG. 2 shows a perspective view looking into an anchor light base.
Figure 3:
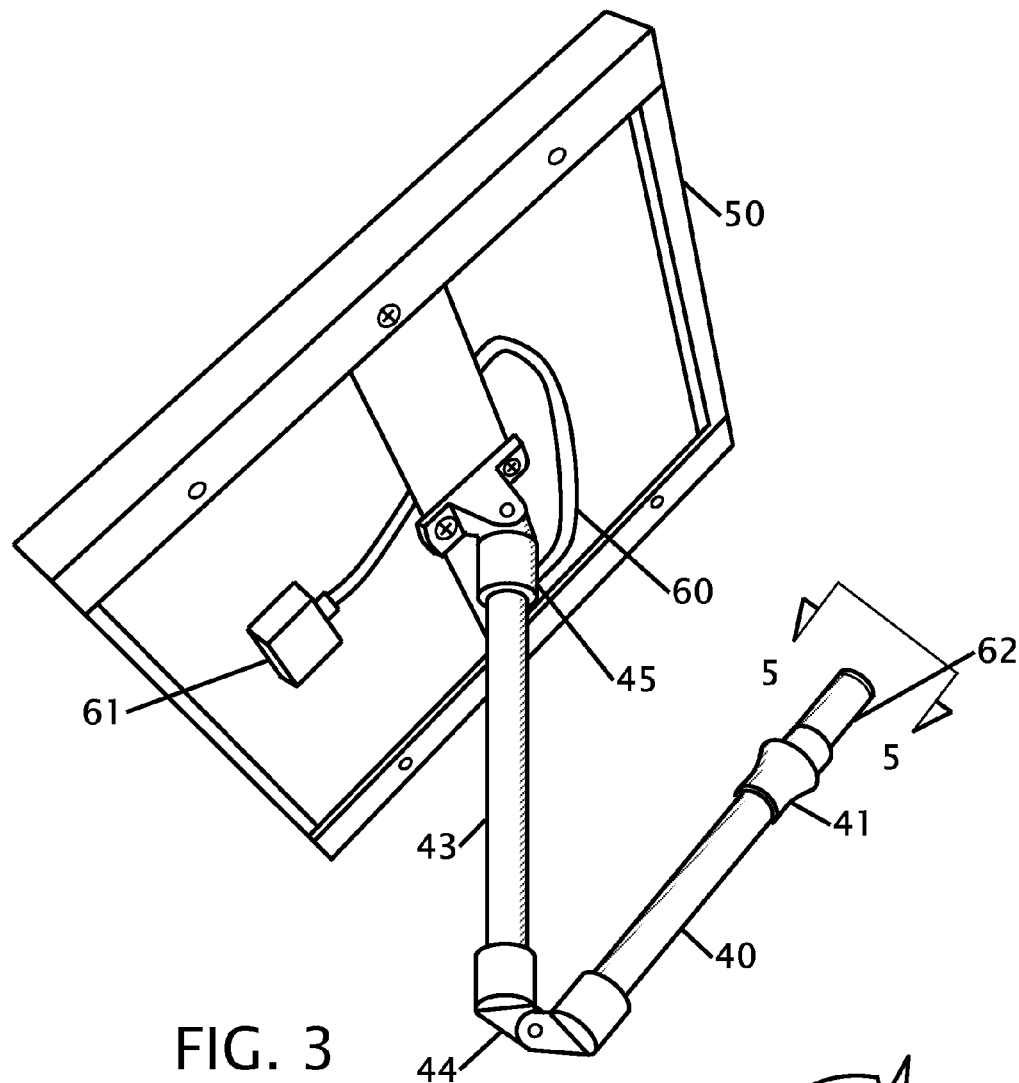
FIG. 3 shows a perspective view of an anchor charger in a first preferred embodiment.
Figure 7:
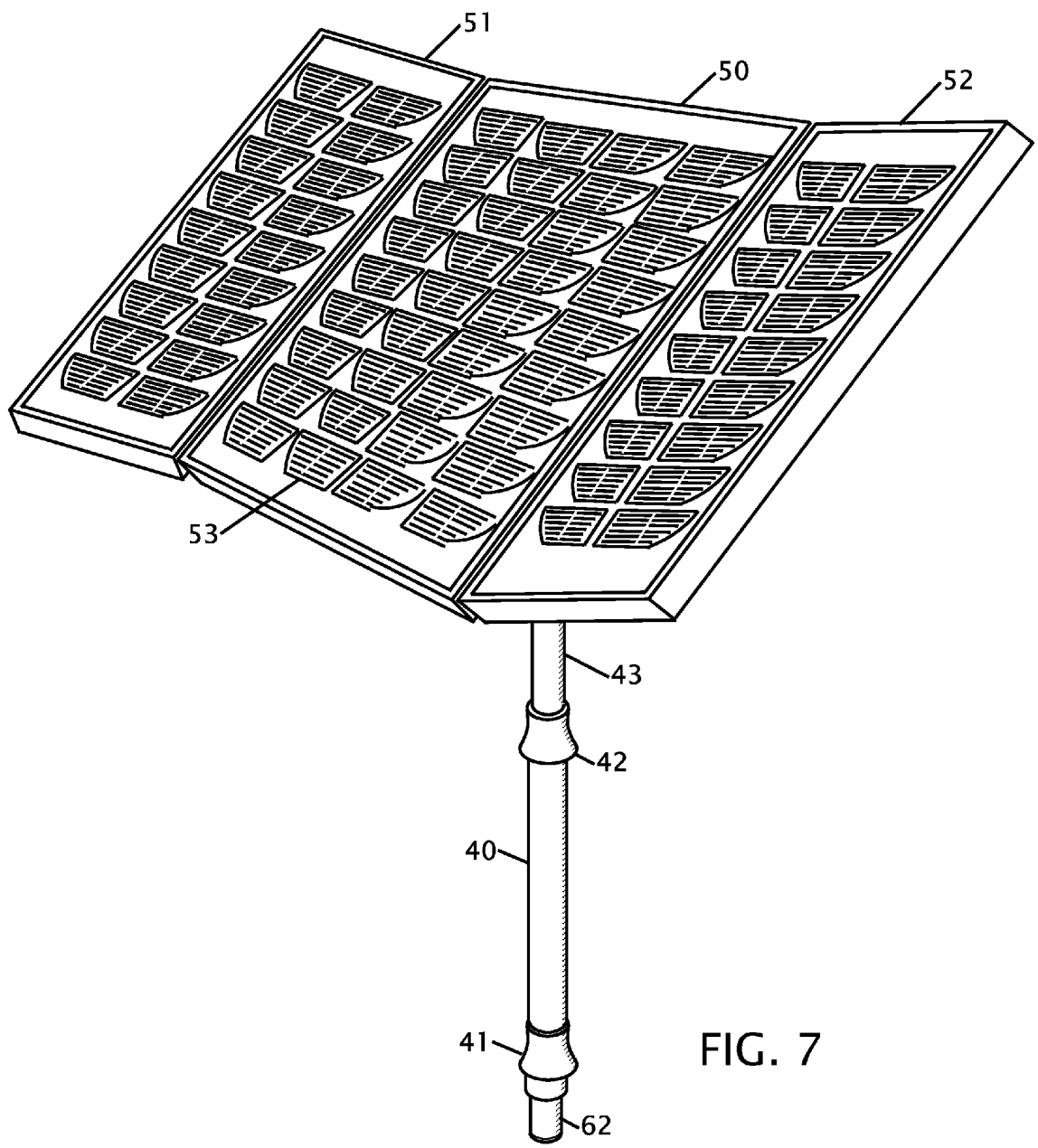
FIG. 7 shows a perspective view of an anchor charger in a second preferred embodiment.

FIG. 2 shows a perspective view looking into an anchor light base 23. The anchor light base 23 has a recessed hole that provides the structural strength to support the pole 21 of the anchor light as shown in FIG. 1, or the pole 62 of the anchor charger as shown in FIGS. 3 and 7. The light base assembly 23 has a female sleeve or inside diameter 32 that is either configured perpendicular or at an angle to the mounting base to give an inserted anchor light an angle as shown in FIG. 1. Looking into the light base assembly 23 two male contact pins 30 and 31 are shown that connect to the electrical system of the boat. A Key 33 ensures that polarity with the contacts 30 and 31 within the light base assembly 23 is maintained. A weatherproof seal or cover 25 can be temporally placed into the inside diameter 32 of the light base assembly 23. One or more fasteners 26 secure the light base assembly 23 onto the boat or vessel.

FIG. 3 shows a perspective view of an anchor charger in a first preferred embodiment. This embodiment includes an articulable elbow 44 that exists between two pole sections 40 and 43. The support pole is preferably a standard ¾" O.D. anodized aluminum support pole, but other materials are contemplated that would provide equivalent performance such as but not limited to corrosion protected metal. This preferred embodiment allows the anchor charger to be tri-folded for storage. It is further contemplated that pole storage clips or hook and loop fasteners can be utilized for storage of the anchor charger in a storage locker. A swivel coupling 45 connects one of the pole sections 43 to the platform 50. The swivel couple allows the angle of the platform 50 to be adjusted to maximize exposure of sunlight onto solar cells that are mounted on the top of the platform 50. The platform is made from anodized aluminum but other materials are contemplated that would provide equivalent performance such as but not limited to corrosion protected metal.

Figure 4:
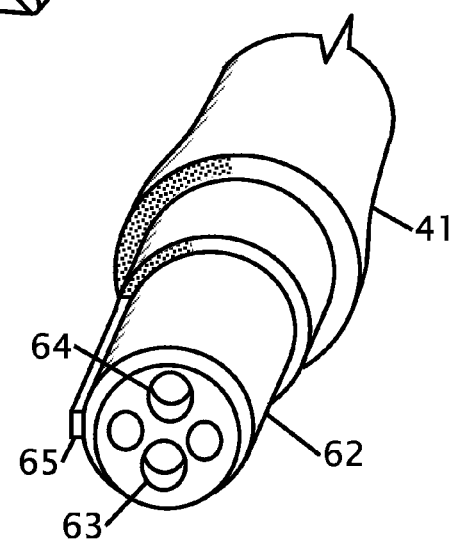
FIG. 4 shows a perspective view looking onto an anchor light base.

The other side of the platform 50 has a plurality of solar cells that are electrically connected into a blocking diode 61 to prevent any possible overcharge of a battery. The blocking diode 61 then connects to a wiring harness 60 that runs through tubes 43 and 40 when it connects to terminals in the shank 62. A detail view looking onto the shank 62 is found in FIG. 4. A base hilt 41 prevents over insertion of the shank 62 into a light base assembly 23 (shown in FIGS. 1 and 2).

Figure 5:
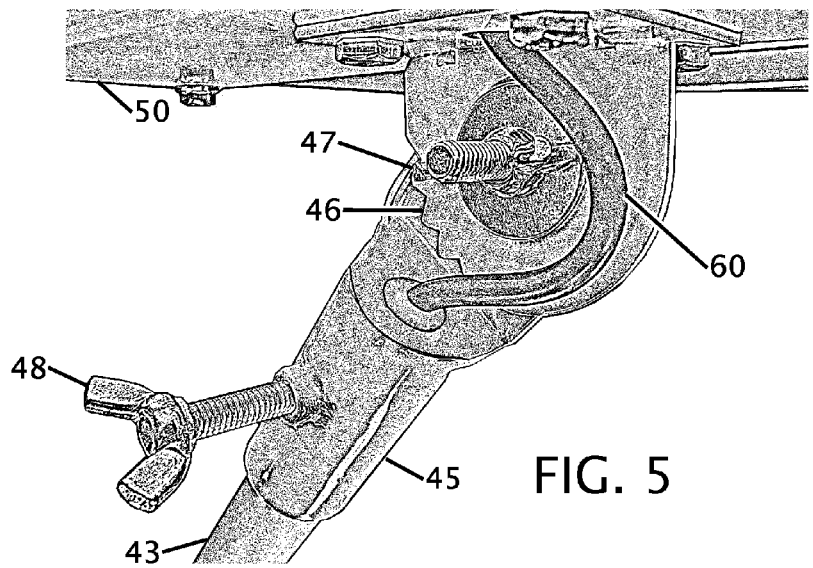
FIG. 5 shows a perspective view of an angle lock for the platform.

FIG. 5 shows a perspective view looking onto an anchor light base. The mating male end shank 62 secures the connection just like any standard anchor light. The end of the male end shank 62 has two female conductors 63 and 64 that connect with conductors 30 and 31 as shown in FIG. 2. In the preferred embodiment onto two conductors are required, but other embodiments are contemplated that use three or for conductors to allow for charging without the anchor light switch 71 to be operated. The male end shank 62 securely fits into and within the inside diameter of the lamp base assembly as shown in FIG. 2. A key 65 ensures proper alignment and polarity of the two sets of conductors. The base hilt 41 prevents over insertion of the shank 62 into a light base assembly. When the anchor charger is installed it produces a charge to the battery by switching the anchor light switch to the ON position while the boat is mooring, beached or docked status.

FIG. 5 shows a perspective view of an angle lock for the platform 50. This swivel 45 uses a toothed angle lock 46 to retain the platform and the solar cells at a plurality of fixed angles using teeth 46 that are locked with an angle lock thumb nut 47. The platform can also swivel on the pole 43 where the rotation of the platform 50 is locked into orientation using thumbscrew 48 that secured the swivel 45 onto the pole 43. The wiring 60 connects from the solar panel into the pole 43.

Figure 6:
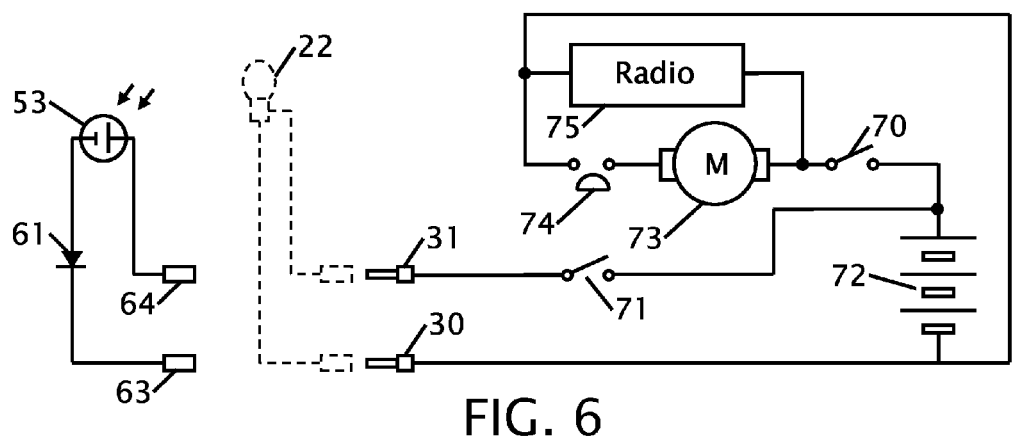
FIG. 6 shows a partial electrical diagram of a vessel with an anchor light and an anchor light charger.

FIG. 6 shows a partial electrical diagram of a vessel with an anchor light and an anchor light charger. In this simplified wiring diagram the battery 72 is connected through anchor light switch 71 to terminals 30 and 31. An anchor light 22 is shown with broken lines where it can connect into terminals 30 and 31. The simplified wiring diagram also shows an ignition or accessory switch 70 that allows the battery 72 to power various other devices including but not limited to a radio 75 and a bilge pump motor 73 that is shown controlled by a float switch 74. The solar cell(s) 53 are connected through a blocking diode 61 and to conductors 63 and 64 that connect into terminals 30 and 31. To operate an anchor light, the anchor light 22 is connected to the circuit and the anchor light switch 71 is set to the on position. The anchor light can then be operated without keys. The anchor light is removed and the anchor charger is inserted into the same connection as the anchor light 22. This diagram shows that the anchor light 22 can be operated without the ignition or accessory switch 70 being on.

FIG. 7 shows a perspective view of an anchor charger in a second preferred embodiment. This embodiment has the platform 50 with two wing platform panels 51 and 52. The wing platforms 51 and 52 provide additional surface area for additional solar cells 53 to increase the charging amount of the anchor charger. In the preferred embodiment the anchor charger produces a minimum of 250 ma and 12 Volts DC but a preferred output is 500 ma at 15 volts DC. The wing platforms 51 and 52 are hinged to the central platform 50 such that they can be folded over the central platform 50 for storage. The platform is connected with a swivel 45 (as shown in FIG. 3) to allow for angular adjustment of the solar cell(s) 53 to optimize solar charging. The poles 40 and 43 are shown in a telescoping arrangement whereby one pole 43 can slide into another pole 40. A connector 42 secures the two poles in an extended orientation. A base hilt 41 prevents over insertion of the shank 62 into a light base assembly 23 (shown in FIGS. 1 and 2).

Thus, specific embodiments of an anchor charger have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An anchor charger comprising: a solar collector on a platform; said adjustable platform is secured to a first end of a pole with an angular swivel coupling; a second end of said pole that is distal from said first end is configured to fit into a female anchor light base; said second end of said pole having an electrical connection to make electrical contact from said solar collector to electrical contacts within said female anchor light base; said platform is angularly adjustable relative to said first end of said pole with a swivel mount that swivel's at said solar collector upon said second end, and said solar collector connects to a battery of a vessel when a pre-existing anchor light switch in said vessels electrical system is in an on position; and said adjustment is a linear adjustment with telescoping pole members that telescope linearly within each other; and said pole is foldable in-half onto the pole itself through an articulating elbow to alter an overall length of said pole.

2. The anchor charger according to claim 1 wherein said solar collector produces at least 12 volts DC when sufficient sunlight is present on said solar collector.

3. The anchor charger according to claim 1 wherein said solar collector further includes a blocking diode.

4. The anchor charger according to claim 1 wherein said solar collector produces at least 250 ma of current when sufficient sunlight is present on said solar collector.

5. The anchor charger according to claim 1 wherein said pole has an adjustable length.

6. The anchor charger according to claim 1 wherein said second end of said pole further includes at least two female electrical receptacles that engage in at least two male electrical receptacles in said female anchor light base.

7. The anchor charger according to claim 1 wherein said electrical connection connects to the electrical system of a boat through said female anchor light base.

8. The anchor charger according to claim 1 wherein said anchor charger is interchangeable with an anchor light.

9. The anchor charger according to claim 1 wherein said solar collector provides sufficient power to trickle charge the battery of a vessel when said solar charger is electrically connected to said female anchor light base and said anchor light switch is in said on position when sufficient sunlight is present on said solar collector.

10. The anchor charger according to claim 1 wherein said platform is made from aluminum or corrosion protected metal.

11. The anchor charger according to claim 1 wherein said pole is made from aluminum or corrosion protected metal.

12. The anchor charger according to claim 1 wherein said female anchor light base provides structural support to said pole said platform and said solar collector.

13. The anchor charger according to claim 1 wherein said anchor charger charges a boat when an accessories ignition setting is off.

* * * * *